United States Patent [19]
Tsukada

[11] Patent Number: 5,184,928
[45] Date of Patent: Feb. 9, 1993

[54] CAP FOR RAIL MOUNTING HOLE OF LINEAR GUIDE DEVICE

[75] Inventor: Toru Tsukada, Gunma, Japan

[73] Assignee: NSK Ltd., Tokyo, Japan

[21] Appl. No.: 858,851

[22] Filed: Mar. 27, 1992

[30] Foreign Application Priority Data

Apr. 5, 1991 [JP] Japan ................. 3-22023[U]

[51] Int. Cl.$^5$ ............................. F16B 43/00
[52] U.S. Cl. .................... 411/371; 411/373
[58] Field of Search ........... 411/429, 430, 431, 371, 411/372, 373, 377, 910, 376

[56] References Cited

U.S. PATENT DOCUMENTS 4,658,558 4/1987 Verble ..................... 411/431 X

FOREIGN PATENT DOCUMENTS 804736 4/1951 Fed. Rep. of Germany ...... 411/373
925314 5/1963 United Kingdom ............. 411/373

*Primary Examiner*—Rodney M. Lindsey
*Attorney, Agent, or Firm*—Sughrue, Mion, Zinn, Macpeak & Seas

[57] ABSTRACT

A rail mounting hole cap for closing a rail mounting hole formed in an upper surface of a guide rail of a linear guide device. The cap comprises a cap body and an elastic covering member. The cap body includes a cylindrical barrel portion having axial slits, a projection formed on an outer periphery of the barrel portion at a lower end thereof, and a cap lid part of which is reduced in thickness. The elastic covering member covers the lid portion of the cap body and is greater in outer diameter than the cap body.

18 Claims, 3 Drawing Sheets

CAP FOR RAIL MOUNTING HOLE OF LINEAR GUIDE DEVICE

BACKGROUND OF THE INVENTION

This invention relates to an improved rail mounting hole cap for closing a mounting bolt insertion hole (hereinafter referred to as "rail mounting hole") in a guide rail of a linear guide device.

In order to mount a guide rail of a linear guide device on a base of a machine by bolting, a plurality of rail mounting holes are formed through a guide rail of a linear guide device, and are spaced at equal intervals in an axial direction thereof. When a bolt is tightened, its head is received in the rail mounting hole, and is stepped downward from the upper surface of the rail, thereby forming a recess. Foreign matters tend to collect in this recess. Therefore, conventionally, the recess is closed by a cap so as to prevent foreign matters from collecting in the recess. There are known rail mounting hole caps of rubber or a synthetic resin having configurations as shown in FIGS. 9 and 10 and FIGS. 11 and 12. Such a rail mounting hole cap is attached by putting a flat metal member on the cap and then by driving the cap little by little using a hammer until the cap surface becomes flush with the upper surface of the rail.

However, each of the conventional rail mounting hole caps of the linear guide device is made of an elastic material such as rubber and a synthetic resin, and is fixed to the guide rail of metal, using its elasticity, and the cap is liable to be elastically deformed. And besides, a dimensional accuracy of the cap can not be easily achieved. Therefore, when the cap is excessively pressed during the attachment of the cap, there has been encountered a problem that the outer peripheral portion of the cap is deformed in shape, and is forced out of the rail mounting hole, or is withdrawn from the hole because of its loose fitting.

In order to prevent foreign matters from collecting, it is necessary that the upper surface of the rail and the cap surface be flat, and there has been encountered a problem that it is not easy to attach the conventional cap, made solely of a lowrigidity elastic material, in such a manner that the withdrawal of the cap is prevented and that the cap surface is flat.

SUMMARY OF THE INVENTION

Therefore, the prevent invention has been made in order to solve the problems of the prior art, and an object of the invention is to provide a rail mounting hole cap of a linear guide device which has both rigidity and elasticity, and can be easily attached and detached, and can not be easily withdrawn, and can be attached flat in such a manner as not to form a rugged portion on a rail surface.

According to the present invention, there is provided a rail mounting hole cap for closing a rail mounting hole formed in an upper surface of a guide rail of a linear guide device, said cap comprising a cap body including a cylindrical barrel portion having axial slits, a projection formed on an outer periphery of said barrel portion at a lower end thereof, and a cap lid part of which is reduced in thickness; and an elastic covering member covering said lid portion of said cap body, said covering member being greater in outer diameter than said cap body.

The projection formed on the outer periphery of the resilient cap body of metal is fitted in the inner peripheral surface of the rail mounting hole, thereby firmly attaching the cap to this hole. The slits in the barrel portion not only impart a spring nature, but also absorb a slight dimensional 1 difference between the inner and outer diameters of the fitting portions, and also assist in discharging the air from the interior of the cap. Thus, the slits facilitate the attachment of the cap, and prevents the cap from being withdrawn by the air pressure.

The elastic covering member can be easily deformed elastically at its outer peripheral surface to fill up the gap between the cap and the rail mounting hole, thereby preventing a step from being formed between the upper surface of the guide rail and the upper surface of the cap.

For removing the cap, a screw driver or the like is pierced through the thinned portion of the upper wall of the cap, and then the cap can be easily removed by pulling.

DETAILED DESCRIPTION OF THE PREFERRED EMBODIMENTS

Figure 1:
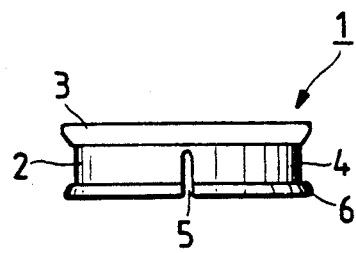
FIG. 1 is a front-elevational view of a rail mounting hole cap of the present invention.
Figure 2:
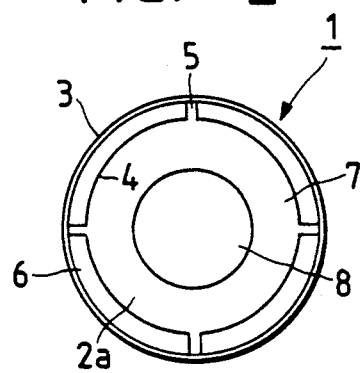
FIG. 2 is a bottom view of the cap of FIG. 1.
Figure 3:
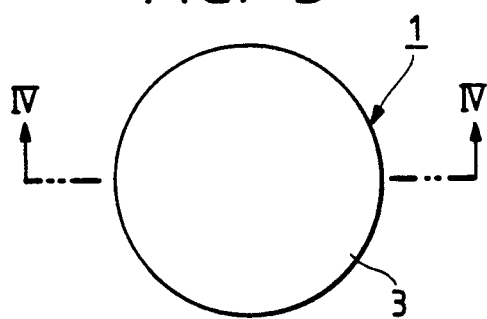
FIG. 3 is a top plan view of the cap of FIG. 1.
Figure 4:
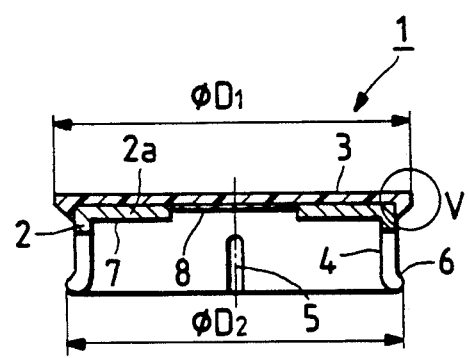
FIG. 4 is a cross-sectional view taken along the line IV—IV of FIG. 3.

Preferred embodiments of the present invention will now be described with reference to the drawings. FIGS. 1 to 3 are views showing an outer configuration of the first embodiment of this invention, and FIG. 4 is a vertical cross-sectional view thereof.

A rail mounting hole cap 1 of this embodiment comprises a cap body 2, and an elastic covering member 3 covering an upper surface of the cap body. The cap body 2 is formed by press-shaping a steel plate, and its cylindrical barrel portion 4 has a plurality of (four in the drawings) axial slits 5. A projection 6 is formed on the outer periphery of the cylindrical barrel portion 4 at the lower end thereof. An outer peripheral portion 7 of a lid portion 2a of the cap body 2 is different in thickness from a central portion 8 thereof, and the central portion 8 is thinner.

Figure 5:
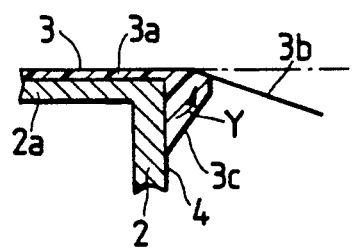
FIG. 5 is an enlarged, cross-sectional view of a portion indicated by V in FIG. 4.

The elastic covering member 3 is a molded of rubber or a synthetic resin, and is integrally secured by bonding, baking or the like to the surface of the lid portion 2a of the cap body 2 and the outer peripheral surface of the upper portion of the cylindrical barrel portion 4. The outer diameter $D_1$ of the elastic covering member 3 is greater than the outer diameter $D_2$ of the projection 6 formed at the lower end of the cylindrical barrel portion 4 ($D_1 > D_2$). In this embodiment, as shown in FIG. 5, the outer peripheral portion of an upper surface 3a of the elastic covering member 3 is slightly slanting downward to provided a slanting surface 3b. Referring to the reason for this, when the rail mounting hole cap 1 is forced into a rail mounting hole, the outer peripheral portion of the upper surface 3a of the resilient covering member 3 is raised as indicated by arrow Y. In view of this raising effect, this outer peripheral portion is beforehand slanting downward so that this outer peripheral portion can be made flat in the raised condition. The side surface of the elastic covering member 3 extending from the slanting surface 3b is defined by a slanting surface 3c slanting in a reverse direction, and the distal end of this side surface is smoothly connected to the cylindrical barrel portion 4 without any step.

The operation will now be described.

Figure 6:
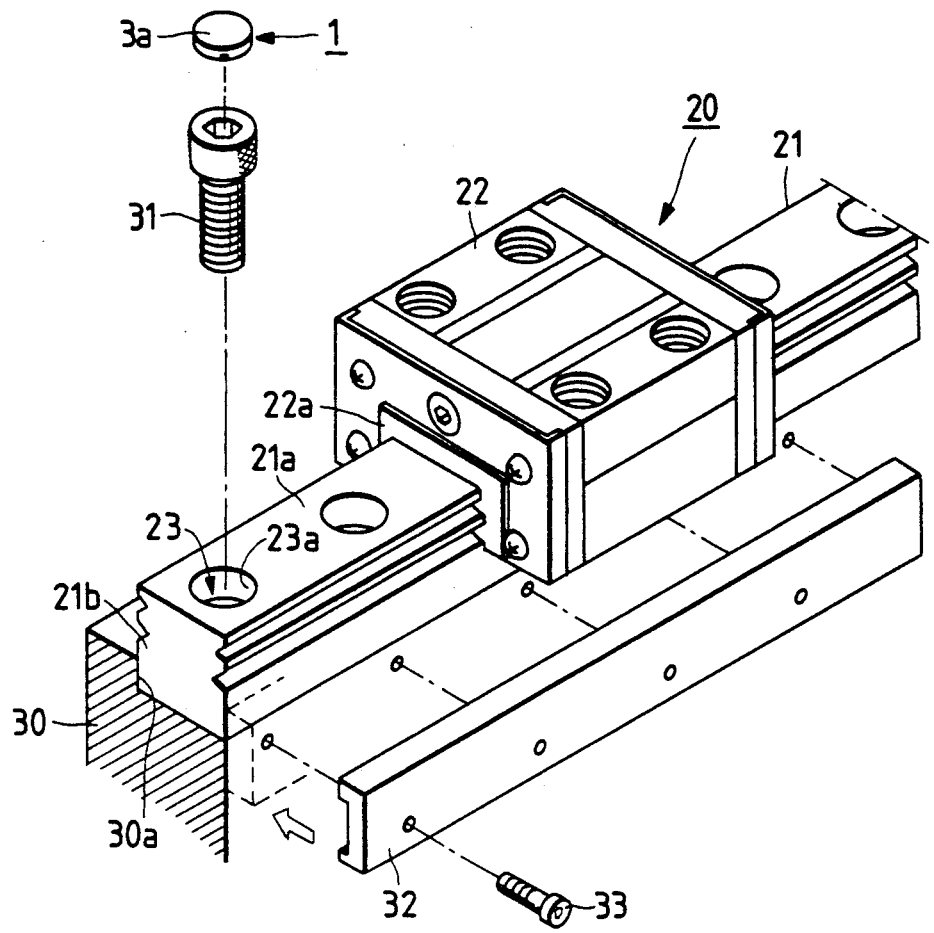
FIG. 6 is a perspective view of a linear guide device showing the manner of mounting the rail mounting hole cap of the invention.
Figure 7:
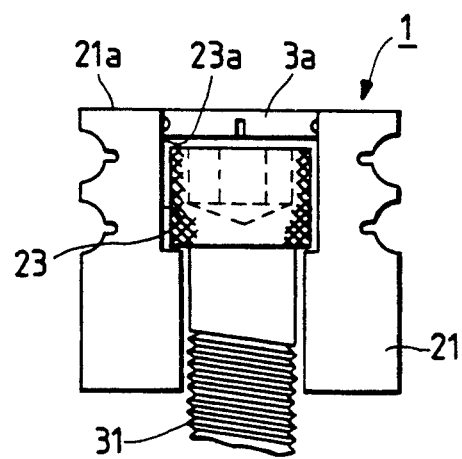
FIG. 7 is a transverse cross-sectional view showing the condition in which the rail mounting hole cap of the invention is attached to a guide rail.

FIG. 6 shows the manner of attaching a linear guide device 20 to a bed 30 of a machine. A guide rail 21 with a slider 22 is placed on the machine bed 30, and rail mounting bolts 31 are inserted respectively into rail mounting holes 23 of the guide rail 21, and are provisionally tightened. Then, the guide rail 21 is lightly urged by a separate lateral push plate 32 so that a mounting surface of the guide rail 21 can be brought into intimate contact with a mounting surface 30a of the machine bed 30, thereby fixing the guide rail Thereafter, the rail mounting bolts 31 are sequentially tightened completely by a torque wrench. Lateral push bolts 33 are also tightened with a predetermined torque. After the rail mounting bolts 31 are completely tightened, the rail mounting hole cap 1 is inserted into the rail mounting hole 23. The projection 6 on the outer periphery of the metal cap body is strongly pressed against an inner peripheral surface 23a of the rail mounting hole 23 because of its resilient force, and also is engaged with a cut surface of the inner peripheral surface 23a. Therefore, this exhibits a large withdrawal prevention force. The slits 5 in the barrel portion impart a spring nature to the cylindrical barrel portion 4, and also absorb a slight dimensional difference between the outer diameter of the projection 6 of the cylindrical barrel portion 6 and the inner diameter of the inner peripheral surface 23a of the rail mounting hole. The slits also function as discharge ports for discharging the air in the rail mounting hole cap 1, and facilitates the attachment of the cap to the rail mounting hole 23, and prevents the attached rail mounting hole cap 1 from being withdrawn by the compressed air pressure therein.

The rail mounting hole cap 1 is press fitted until the upper surface 3a of the elastic covering member 3 becomes flush with an upper surface 21a of the guide rail. The slanting surface 3c at the outer peripheral surface of the elastic covering member 3 of rubber or a synthetic resin is urged upward by the press-fitting to be elastically deformed, so that the slanting surface 3b is raised upward to fill up a gap between this surface and the rail mounting hole 23, thereby preventing a step or a recess from being formed between the upper surface 21a of the guide rail and the upper surface 3a of the elastic covering member of the rail mounting hole cap 1.

By dosing so, the upper surface 21a of the guide rail 21 is made flat, and even if a foreign matter deposits on this upper surface, such a foreign matter can be easily swept off by a side seal 22a attached to the end face of the slider 22, and therefore can be prevented from intruding into the inside of the slider 22.

When the rail mounting hole cap 1 is to be detached, a screw driver or the like is penetrated through the thinner central portion 8 of the lid portion 2a of the cap body, and then can be easily removed by pulling.

Figure 8:
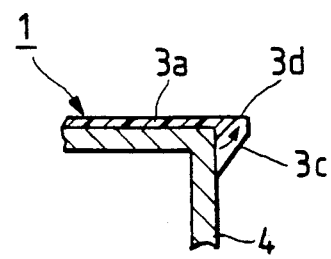
FIG. 8 is a view similar to FIG. 5, but showing another embodiment of a rail mounting hole cap of the invention.
Figure 9:
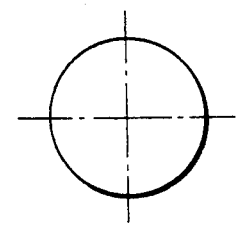
FIG. 9 is a top plan view of a conventional rail mounting hole cap.
Figure 10:
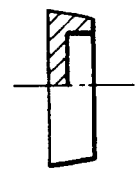
FIG. 10 is a partly cross-sectional, side-elevational view of the cap of FIG. 9.
Figure 11:
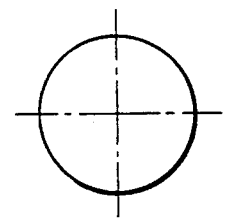
FIG. 11 is a top plan view of another conventional rail mounting hole cap.
Figure 12:
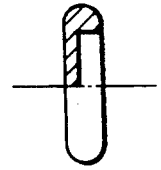
FIG. 12 is a partly cross-sectional, side-elevational view of the cap of FIG. 11.

FIG. 8 shows another embodiment in which the downwardly-slanting surface 3b is not formed on an outer peripheral portion 3d of an upper surface 3a of an elastic covering member 3 of an rail mounting hole cap 1, and this outer peripheral portion 3d has a flat surface. When this rail mounting hole cap 1 is attached to the rail mounting hole 23 of the guide rail, the outer peripheral portion 3d of the elastic covering member is raised to bulge above the upper surface 21a of the guide rail. This bulged portion is cut off to provide a flat surface after the attachment.

The number of the slits 5 in the cylindrical barrel portion 4 is not limited to 4 as in the above embodiment.

As described above, in the present invention, the cap comprises the cap body including the cylindrical barrel portion having the axial slits, the projection formed on the outer periphery of the barrel portion at the lower end thereof, and the cap lid part of which is reduced in thickness, and the elastic covering member covering the lid portion of the cap body, the covering member being greater in outer diameter than the cap body. The slits in the cap body impart a spring nature, and absorb the dimensional difference between the inner and outer diameters of the fitting portions, and assists in discharging the air from the interior of the cap, thereby facilitating the attachment of the cap. The cap can be easily removed by breaking the thinned portion of the cap. The elastic covering member can be easily deformed elastically to fill up the gap between the cap and the rail mounting hole to provide the flat surface, and as a result there is advantageously provided the rail mounting hole cap for the linear guide rail which cap can be easily attached and detached, can not be easily withdrawn, and can be mounted flat so as not to form a rugged portion on the rail surface.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. A rail mounting hole cap for closing a rail mounting hole formed in an upper surface of a guide rail of a linear guide device, said cap comprising:
    a cap body (2) including a cylindrical barrel portion (4) having axial slits (5), a projection (6) formed on an outer periphery of said barrel portion at a lower end thereof, and a cap lid portion (2a) having a portion (8) reduced in thickness; and
    an elastic covering member (3) covering said lid portion (2a) of said cap body (2), said covering member (3) being greater in outer diameter than said cap body (2).

2. A rail mounting hole cap according to claim 1, in which said cap body (2) is formed by press-shaping a steel plate, and said covering member (3) is formed by molding a rubber and is integratly secured by baking to a surface of the lid portion (2a) of said cap body (2) and the outer peripheral surface of the upper portion of said cylindrical barrel portion (4).

3. A rail mounting hole cap according to claim 1, in which said cap body (2) is formed by press-shaping a steel plate, and said covering member (3) is formed by molding a rubber and is integrally secured by bonding means to a surface of the lid portion (2a) of said cap body (2) and the outer peripheral surface of the upper portion of said cylindrical barrel portion (4).

4. A rail mounting hole cap according to claim 1, in which the outer diameter ($D_1$) of said elastic covering member (3) is greater than the outer diameter ($D_2$) of said projection (6) formed at the lower end of said cylindrical barrel portion (4).

5. A rail mounting hole cap according to claim 2, in which the outer diameter ($D_1$) of said elastic covering member (3) is greater than the outer diameter ($D_2$) of said projection (6) formed at the lower end of said cylindrical barrel portion (4).

6. A rail mounting hole cap according to claim 3, in which the outer diameter ($D_1$) of said elastic covering member (3) is greater than the outer diameter ($D_2$) of said projection (6) formed at the lower end of said cylindrical barrel portion (4).

7. A rail mounting hole cap according to claim 1, in which the outer peripheral portion of the upper surface (3a) of the elastic covering member (3) is slightly slanting downward to provide a slanting surface (3b).

8. A rail mounting hole cap according to claim 2, in which the outer peripheral portion of the upper surface (3a) of the elastic covering member (3) is slightly slanting downward to provide a slanting surface (3b).

9. A rail mounting hole cap according to claim 3, in which the outer peripheral portion of the upper surface (3a) of the elastic covering member (3) is slightly slanting downward to provide a slanting surface (3b).

10. A rail mounting hole cap according to claim 4, in which the outer peripheral portion of the upper surface (3a) of the elastic covering member (3) is slightly slanting downward to provide a slanting surface (3b).

11. A rail mounting hole cap according to claim 5, in which the outer peripheral portion of the upper surface (3a) of the elastic covering member (3) is slightly slanting downward to provide a slanting surface (3b).

12. A rail mounting hole cap according to claim 6, in which the outer peripheral portion of the upper surface (3a) of the elastic covering member (3) is slightly slanting downward to provide a slanting surface (3b).

13. A rail mounting hole cap according to claim 1, in which the outer peripheral portion of the upper surface (3a) of the elastic covering member (3) is a flat surface.

14. A rail mounting hole cap according to claim 2, in which the outer peripheral portion of the upper surface (3a) of the elastic covering member (3) is a flat surface.

15. A rail mounting hole cap according to claim 3, in which the outer peripheral portion of the upper surface (3a) of the elastic covering member (3) is a flat surface.

16. A rail mounting hole cap according to claim 4, in which the outer peripheral portion of the upper surface (3a) of the elastic covering member (3) is a flat surface.

17. A rail mounting hole cap according to claim 5, in which the outer peripheral portion of the upper surface (3a) of the elastic covering member (3) is a flat surface.

18. A rail mounting hole cap according to claim 6, in which the outer peripheral portion of the upper surface (3a) of the elastic covering member (3) is a flat surface.

* * * * *